(12) United States Patent
Dazet (10) Patent No.: US 8,777,160 B2
(45) Date of Patent: Jul. 15, 2014

(54) AIRCRAFT INCLUDING AN INTERNAL PARTITION

(75) Inventor: Francis Dazet, Tournous-Darre (FR)

(73) Assignee: Airbus Operations (S.A.S.), Toulouse Cedex (FR)

( * ) Notice: Subject to any disclaimer, the term of this patent is extended or adjusted under 35 U.S.C. 154(b) by 17 days.

(21) Appl. No.: 13/511,853

(22) PCT Filed: Nov. 30, 2010

(86) PCT No.: PCT/FR2010/052577
§ 371 (c)(1),
(2), (4) Date: May 24, 2012

(87) PCT Pub. No.: WO2011/064519
PCT Pub. Date: Jun. 3, 2011

(65) Prior Publication Data
US 2012/0267478 A1    Oct. 25, 2012

(30) Foreign Application Priority Data

Nov. 30, 2009  (FR) ...................................... 09 58505

(51) Int. Cl.
*B64C 1/00* (2006.01)
(52) U.S. Cl.
USPC ...................................... 244/119; 244/117 R
(58) Field of Classification Search
USPC ............................................. 244/119, 117 R
See application file for complete search history.

(56) References Cited

U.S. PATENT DOCUMENTS

| | | | |
|---|---|---|---|
| 2,519,393 A | 8/1950 | Noyes | |
| 2,840,259 A | 6/1958 | Steidl | |
| 5,451,015 A * | 9/1995 | Cronkhite et al. | 244/135 R |
| 5,788,184 A * | 8/1998 | Eddy | 244/121 |
| 5,899,412 A * | 5/1999 | Dilorio et al. | 244/119 |
| 7,083,147 B2 * | 8/2006 | Movsesian et al. | 244/121 |
| 7,810,756 B2 * | 10/2010 | Alby et al. | 244/119 |
| 8,366,043 B2 * | 2/2013 | Stephan | 244/119 |
| 8,398,021 B2 * | 3/2013 | Koch et al. | 244/119 |
| 8,444,089 B2 * | 5/2013 | Mischereit et al. | 244/119 |
| 2006/0145013 A1 * | 7/2006 | Gomez | 244/130 |
| 2007/0164162 A1 | 7/2007 | Olive et al. | |

(Continued)

FOREIGN PATENT DOCUMENTS

| | | | |
|---|---|---|---|
| DE | 26 59 401 A1 | 8/1977 | |
| DE | 38 44 080 A1 | 7/1990 | |

(Continued)

OTHER PUBLICATIONS

Translation of Jun. 28, 2011 International Search Report issued in International Patent Application No. PCT/FR2010/052577.

(Continued)

*Primary Examiner* — Christopher P Ellis
*Assistant Examiner* — Medhat Badawi
(74) *Attorney, Agent, or Firm* — Oliff PLC (57) ABSTRACT

The aircraft includes a structural portion such as a fuselage, a wing, or a tail, the structural portion including a wall separating the inside from the outside of the portion and including fractions defining between them an inside volume of the portion and at least one structural partition separating zones of the volume, e.g. a front zone and a rear zone, from each other, the partition including at least one flexible diaphragm suitable for deforming and at least two preferably rigid supports supporting the diaphragm in discontinuous manner.

11 Claims, 5 Drawing Sheets

(56) References Cited

U.S. PATENT DOCUMENTS

2010/0000991 A1* 1/2010 Henry et al. .................. 219/679
2010/0059626 A1* 3/2010 Cazals et al. ................. 244/119
2010/0276539 A1* 11/2010 Brinkmann et al. .......... 244/121
2012/0267478 A1* 10/2012 Dazet ............................ 244/119

FOREIGN PATENT DOCUMENTS

| FR | 2 894 561 | 6/2007 |
|----|-----------|--------|
| GB | 581142    | 10/1946 |
| GB | 626443    | 7/1949 |
| GB | 857616    | 1/1961 |

OTHER PUBLICATIONS

Translation of Jun. 28, 2011 Written Opinion of the International Searching Authority issued in International Patent Application No. PCT/FR2010/052577.

* cited by examiner

AIRCRAFT INCLUDING AN INTERNAL PARTITION

FIELD OF THE INVENTION

The invention relates to structural portions of aircraft, such as fuselages.

BACKGROUND OF THE INVENTION

It is known to provide a structural partition inside the fuselage of an airplane in order to separate two zones of the inside volume from each other. It is sometimes desirable for such a partition to be sealed so as to be gas-tight or liquid-tight. For example, one of the zones defined by the partition may be pressurized, unlike the other zone, or one of the zones may be used as a fuel tank. The junction between the partition and the wall of the fuselage is made at an angle that is locally perpendicular to the wall and to the parts of the primary structure of the airplane, which structure comprises frames, stiffeners, stringers, beams, etc.

Such a partition may be installed permanently when the airplane is fabricated. However it may be desirable to install such a partition as a retrofit, i.e. in an airplane that was not originally designed to receive it. This applies in particular for an airplane that has already flown.

Unfortunately, putting such a partition into place raises various problems.

Since it is a structural partition, it must be capable of withstanding required levels of force. For this purpose, it is known to fasten the partition to the primary structure by means of fishplates extending on either side of the partition and requiring at least two parts and a plurality of structural fastenings. It is preferred to fasten the partition to the fuselage without cutting into the parts of the primary structure so as to avoid endangering its mechanical properties. However, when it is also desired to save weight, such an arrangement is found to be too heavy or to be critical in terms of fatigue. Under such circumstances, sealing is provided by means of a putty and a large number of small pieces of thin sheet metal that take a long time to put into place, thereby keeping the airplane out of service on the ground for a long period, and this operation is also complex, thereby making it expensive.

Furthermore, the partition must adapt appropriately to the dimensions of the fuselage that was not originally designed to receive it.

Furthermore, it must be compatible with the deformations to which the fuselage is subjected while the airplane is in use.

OBJECT AND SUMMARY OF THE INVENTION

An object of the invention is to enable a structural partition to be put into place simply and quickly, in particular as a retrofit.

To this end, the invention provides an aircraft that includes a structural portion such as a fuselage, a wing, or a tail, the structural portion comprising:
  a wall separating the inside from the outside of the portion and comprising fractions defining between them an inside volume of the portion;
  and at least one structural partition separating zones of the volume, e.g. a front zone and a rear zone, from each other, the partition comprising at least one flexible diaphragm suitable for deforming and at least two preferably rigid supports supporting the diaphragm in discontinuous manner.

The diaphragm thus serves to adapt the dimensions of the partition to the actual dimensions of the already-made structural portion and to the deformations to which it is subjected while the aircraft is in use. Furthermore, the supports enable the partition to take up the necessary structural forces and to transmit them to the structural portion. The partition may be installed in an existing aircraft in a short period of time, and thus without keeping the aircraft grounded for a long time. Installation can be performed in a manner that is relatively simple and inexpensive. It may be performed in such a manner as to make the partition gas-tight and/or liquid-tight. Although the partition of the invention is particularly appropriate for retrofitting, i.e. for said partition being put into place inside an already-existing aircraft, or at least in a structural portion that has already been made, the invention is also usable for use with original equipment, i.e. for fastening such a partition during initial construction of the aircraft.

The partition is preferably fastened to the structural portion by means that are separable.

The partition is thus removable and may be removed easily and quickly, should that be necessary. This removable nature of the partition is compatible with its structural nature and where appropriate with its sealed nature.

Advantageously, the partition subdivides the two zones in sealed manner.

The structural portion preferably includes at least one frame, at least one stringer, and a molded block forming a sealed junction between the frame and the stringer.

The partition preferably includes at least one door.

When the invention is implemented in a fuselage, this door can be used for passing one or more crew members and/or equipment, for example.

Advantageously, the diaphragm comprises a reinforced elastomer.

Preferably, the structural portion comprises at least one transverse panel connecting the supports to the remainder of the structural portion.

Provision may thus be made for the panel(s) to be fastened permanently to the structural portion and not designed to be separable therefrom, while the portion of the partition that is fastened to the panels can easily be removed.

There are preferably at least two panels such that the supports are connected to the structural portion independently of the diaphragm exclusively by means of the panels.

Provision is advantageously made for each support to comprise at least two beams that are connected to each other remotely from their ends.

Each support is preferably connected in non-rigid manner to the structural portion.

This makes the partition compatible with the deformations to which the structural portion is subjected while the aircraft is in use.

Advantageously, each support presents one end that is mounted to move relative to the wall in at least one direction perpendicular to the longitudinal direction of the structural portion.

Each support is preferably connected in non-rigid manner to the other support.

The supports may thus present a certain amount of freedom to move relative to one another, likewise enabling the structural partition to adapt to the deformations to which the structural portion is subjected.

Advantageously, each support is connected to the other support via its ends only.

Advantageously, the supports are vertical.

Advantageously, the supports extend on one side of the diaphragm.

The diaphragm can thus deform and for example take up curvature that is the inverse of the curvature it is originally designed to have, and to do so over a segment of the diaphragm or over the diaphragm as a whole, e.g. in the event of the pressure differential on opposite sides of the partition being reversed.

Advantageously, each support carries a diaphragm segment.

Advantageously, each support presents at least one inclined face against which the diaphragm can bear.

This provides surface-to-surface contact in an appropriate orientation between the support and the diaphragm in order to avoid damaging the diaphragm.

Advantageously, the diaphragm is made up of a plurality of disjoint portions.

Advantageously, the diaphragm is supported by each support while having a rounded shape, e.g. a shape that is cylindrical and/or spherical, and/or the diaphragm may extend from one support to another following a shape that is rounded, e.g. cylindrical and/or spherical.

The diaphragm is thus better at withstanding the pressure to which it might be subjected on one side only thereof, in comparison with the diaphragm having a configuration that is plane.

Advantageously, the diaphragm comprises a plurality of rounded sectors arranged side by side.

Preferably, the partition comprises:
at least two diaphragm segments; and
at least three segment support members following one another in a transverse direction, the or each intermediate member in the succession carrying the two segments, which segments are arranged in such a manner that:

$$\Theta_2 = \arctan(\tan \Theta_1 \times l_1/l_2)$$

where:
$\Theta_i$, with i =1 or 2, designates a non-zero angle between the transverse direction and a tangent to the segment i at its junction with the intermediate member; and
li designates a distance between webs of the members carrying the diaphragm i, l1 being different from l2.

Thus, in the presence of irregular spacing between the support members, arrangements are made for the stresses on the intermediate member to be balanced. There is therefore no need to reinforce this member to enable it to withstand any particular unbalance. This makes it possible to obtain a partition of smaller weight.

In one embodiment, the structural portion is a fuselage.

The invention also provides a method where, in an aircraft comprising a wall of a structural portion such as a fuselage, a wing or a tail, separating the outside and the inside of the portion and such that fractions of the wall define between them an inside volume of the structural portion, at least one structural partition is installed separating zones of the volume, e.g. a front zone and a rear zone, from each other, the partition comprising at least one flexible diaphragm suitable for deforming and at least two supports supporting the diaphragm in discontinuous manner, the installation being performed in particular after the aircraft has flown.

Preferably, the installation is performed by fastening the partition to the structural portion by means that are separable.

Preferably, in order to make a sealed junction between parts of the aircraft that are elongate and that extend locally in main directions that are not mutually parallel:
a plurality of mold portions are assembled on those parts; and
a sealing material is injected into the mold.

Sealing is thus achieved by means of a sealed block that is molded in situ on the part. Where necessary, this sealing can be made to be compatible with a pressure differential between opposite sides of the block. The method is easily implemented on an existing airplane, e.g. on an airplane that is being converted with major structural modifications. It is inexpensive and easy to perform. It does not require the addition of parts that remain permanently in place, nor does it require the installation of fastenings other than those needed for keeping the mold temporarily in place. The block that is made is of the appropriate volume. The method may be implemented repetitively while keeping control over the weight of material that is installed in this way. If necessary, the sealed junction may be removed, and then remade should that be necessary, without inflicting any structural damage. This advantage is particularly important when it is necessary to repair or to visually inspect the zone in question within the aircraft. The method may be implemented by using a sealing material that is sufficiently flexible to accommodate the movements between the structural parts while the aircraft is in use.

BRIEF DESCRIPTION OF THE DRAWINGS

Other characteristics and advantages of the invention appear further from the following description of an embodiment given by way of non-limiting example and with reference to the accompanying drawings, in which.

MORE DETAILED DESCRIPTION

Figure 1:
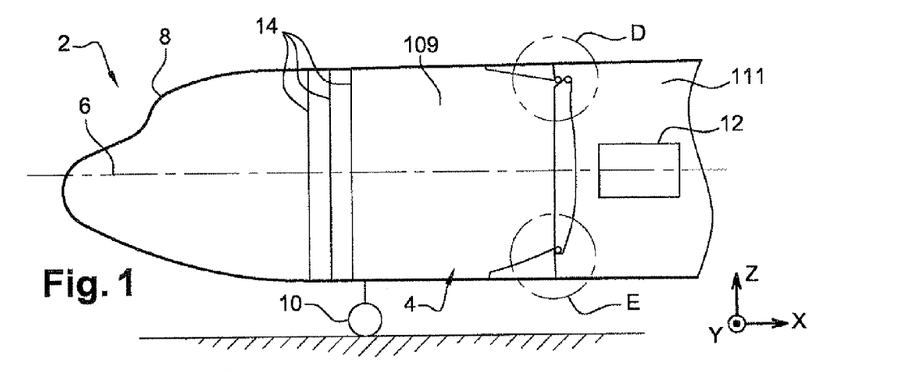
FIG. 1 is a longitudinal vertical axial section view of an aircraft of the invention showing the principle on which the partition is configured.

The aircraft shown in FIG. 1 is an aerodyne, and more specifically an airplane 2. It comprises a fuselage 4 of generally elongate cylindrical shape having the horizontal axis 6 as its main axis. The front of the fuselage has a cockpit 8. The airplane is provided with wings (not shown), landing gear, a portion 10 of which is visible in FIG. 1, and engines 12.

Below, reference is made to an X, Y, Z rectangular frame of reference in which the X and Y directions are horizontal and mutually perpendicular, the X direction being parallel to the axis 6, and the Z direction is vertical.

It is assumed here that fabrication of the aircraft 2 has been completed, or indeed that the aircraft has already flown. The idea is to install a removable sealed structural partition during a retrofit stage. This partition is designed to be sealed so as to be air-tight against the cabin pressure that is to exist on one side only of the partition, specifically in front of it. It is also desirable to ensure that the partition can be installed quickly and also removed quickly, should that be necessary, i.e. within a few hours.

The fuselage has frames 14 of circular shape, each extending generally in a plane that is perpendicular to the axis 6 and carrying the skin 28 of the fuselage. The skin is reinforced by horizontal stringers 116 in the form of section members that are also fastened to the frames. The frames are arranged in mutually parallel planes that follow one another along the axis 6. It is assumed here that the partition is installed so as to extend generally in a plane that is perpendicular to the axis 6, in the vicinity of the frame numbered 30 in the succession of frames that starts at the nose of the aircraft.

Figure 2:
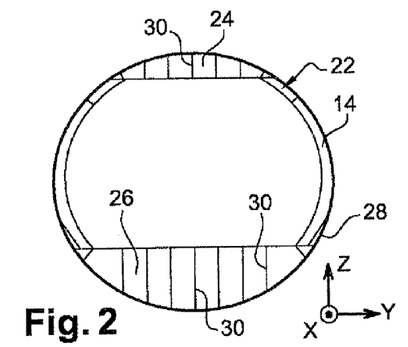
FIG. 2 is a rear view of the FIG. 1 fuselage showing the stationary elements supporting the partition.

A rigid subassembly 22 is provided to support the partition 20, the subassembly being rigidly fastened to the fuselage 4 and specifically being permanently fastened thereto. It extends at the periphery of the partition. It comprises the left and right lateral segments of the frame 14 together with top and bottom plane panels 24 and 26. The panels are fastened directly to the skin 28. The top panel 24 extends continuously from the fuselage skin 28 to the height of a ceiling of a cabin of the airplane. The bottom panel 26 extends continuously from the skin 28 to the height of the floor of the cabin. These panels are fastened to the main structure of the airplane. Each of them is self-stiffened, and specifically each is provided with vertical rectilinear elongate stiffeners 30 that are parallel and spaced apart from one another. The top and bottom panels 24 and 26 may present openings 110 for allowing various systems to pass through them, such as ducts for air and liquid, e.g. water, electrical and computer cables, etc.

Figure 3:
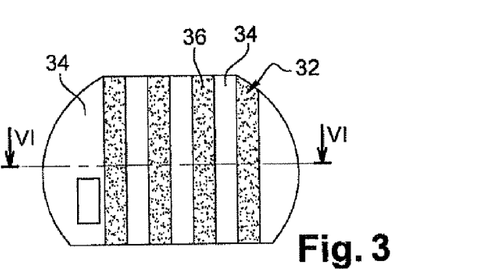
FIG. 3 is a view analogous to FIG. 2 showing the center portion of the partition that is to be fastened to the stationary elements of FIG. 2.

With reference to FIG. 3, the partition 20 comprises a subassembly 32 that is fastened to the subassembly 22 by means enabling it to be removed easily and quickly. The subassembly comprises a non-rigid framework comprising rigid portions 34 and deformable flexible zones 36. In the present example that is shown in detail in FIG. 5, there are five rigid portions 34 and five deformable flexible zones 36.

Figure 4:
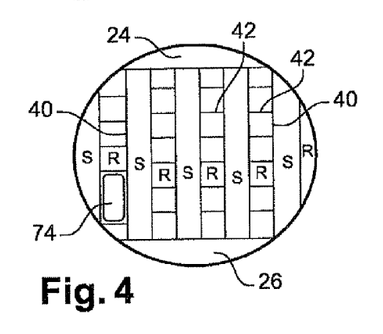
FIG. 4 is a view analogous to FIG. 2 showing the principle on which the diaphragm supports are arranged.
Figure 5:
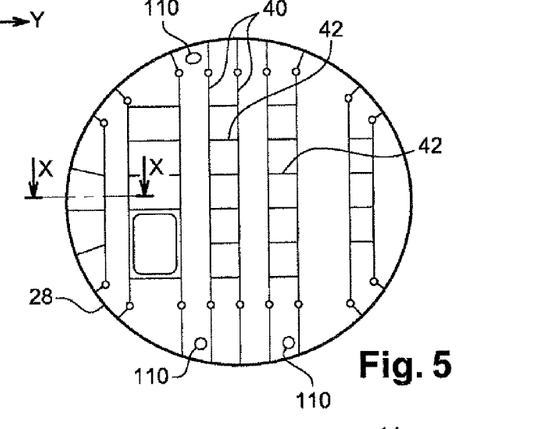
FIG. 5 is a detail view analogous to FIG. 4.
Figure 6:
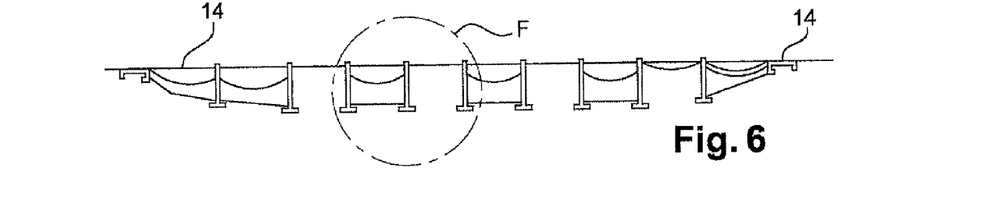
FIG. 6 is a section view on plane VI-VI of the FIG. 3 partition.

Specifically, the rigid portions and the flexible zones follow one another in alternation from one side of the fuselage to the other, here beginning on the left with a rigid portion 34, and as represented by the letters "R" and "S" (for "supple") in FIG. 4. Each portion or each zone extends over the full height of the subassembly 32. Those that are in the middle zone of the subassembly are generally rectangular in shape. There are six of them in this example as can be seen in FIGS. 3, 4, and 5, and they extend from the top panel 24 to the bottom panel 26 to which each of them is fastened individually.

In this example, each of the rigid or support portions 34 comprises two vertical rectilinear beams 40 that are spaced apart from each other, e.g. at a spacing of 500 millimeters (mm). The beams are preferably situated in register with longitudinal rails of the floor of the aircraft. Each rigid portion has stabilizers in the form of intercostal ties 42 rigidly interconnecting the two beams. The stabilizers are fastened to the beams at a distance from the ends thereof and they are regularly spaced apart vertically along the beams, co-operating therewith to form a ladder configuration. The stabilizers 42 as fastened in this way to the beams make each portion 34 rigid.

Figure 11:
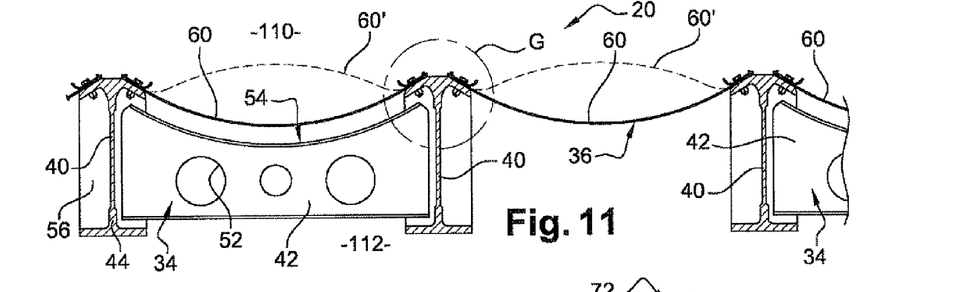
FIGS. 11 and 12 are larger-scale views of details F and G of FIGS. 6 and 11 respectively.
Figure 12:
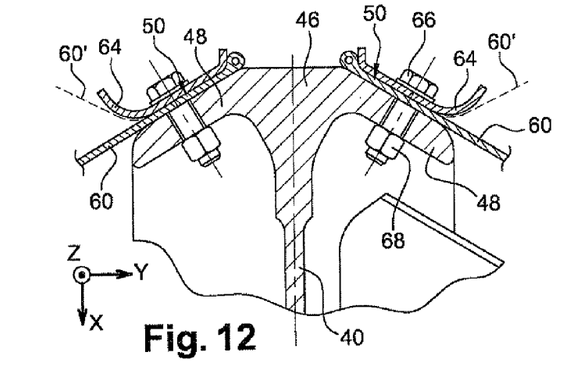

With reference to FIGS. 11 and 12, each beam 40 is formed by a section member of generally H-shaped section. The flange plate 44 of the section member is plane in shape, while the front flange plate, as shown in detail in FIG. 12, is shown as being generally an upside-down V-shape such that the two flanges 48 of the flange plate are rearwardly inclined. Each flange thus presents a vertical plane front face 50 that is inclined towards one side of the fuselage, e.g. forming an angle of about 30° relative to the transverse direction Y.

Each stabilizer 42 is generally plane in shape and extends in a horizontal plane. It may present holes 52 in order to reduce its weight. In this example its rear edge is rectilinear, while its front edge 54 presents a concave curved shape, e.g. a circularly arcuate shape, such that the middle portion of this edge is closer to the rear edge than are its end portions. The stabilizer 42 is fastened to the ribs 56 of the associated beams 40. The edge 54 is also set back from the flanges 48 and thus from the front faces 50 thereof.

At least one of the rigid portions 34 may be arranged to receive a door 74, as shown in FIG. 4, or a passage of some other type enabling equipment or crew to pass through the partition. The door may be provided with a frame having a Z-shaped profile including a sealing gasket. The door may comprise a self-stiffened skin, two horizontal fittings supporting hinges and door stops, an operating and locking mechanism, and a safety porthole.

Each rigid portion 34 carries a segment of deformable flexible diaphragm 60 that is fastened to the beam 40 so as to be capable of moving and deforming. Specifically this is a layer of non-metallic material such as an aramid resin in the form of fibers, e.g. a poly-para-phenylene terephthalamide as sold under the name Kevlar. This resin is embedded in a layer of silicone by an injection method, such that the diaphragm 60 is reinforced and is capable of withstanding a cabin pressure differential of the type to which an airplane flying at stratospheric altitude may be subjected.

Figure 13:
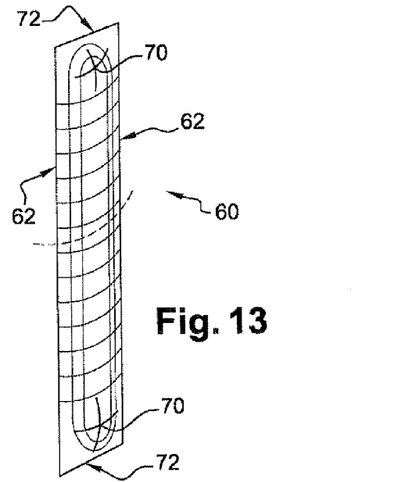
FIG. 13 is a perspective view of one of the segments of the FIG. 11 diaphragm.

The diaphragm 60, shown in particular in FIG. 13, has mutually parallel vertical rectilinear side edges 62, whereby it is fastened to the faces 50 of two corresponding beams by being sandwiched between the flange 48 and a strap 64. The strap is fastened to the flange, e.g. by means of bolts 66, washers, and captive nuts 68 located at the rear portion of the flange.

As shown in particular in FIG. 11, the diaphragm segment 60 is fastened to the beams so that on going from one beam to another, it has a shape that is not plane, specifically it has a rounded shape of cylindrical horizontal section. The diaphragm thus extends along the front edge 54 of the stabilizer 42, while remaining at a distance therefrom all along its length. The radius of curvature of the diaphragm may for example be less than or equal to 800 mm. The diaphragm is mounted so as to be capable of reversing its curvature, i.e. inverting it, such that its center of curvature is no longer in front of the partition but is behind it, as shown by dashed line 60'. This reversal may occur for example in the event of the depressurization of the cabin.

As shown in FIG. 13, the top and bottom end portions 70 of the diaphragm segment have a configuration that is rounded in two mutually perpendicular directions, specifically a spherical configuration. In this example, the top and bottom edges 72 of the diaphragm are rectilinear and horizontal.

The flexible zones 36 of the partition 20 are formed solely by one segment of reinforced diaphragm 60. It is fastened to the flanges 48 of the beams that are closest to the adjacent rigid portions 34 as shown in particular in FIG. 11. The shape and the fastening of the diaphragm segment are the same as for the diaphragm segment of each rigid portion 34.

The partition 20 is thus made up of the framework and of the diaphragm segments 60 that it carries.

Figures 7, 8, 9, 10:
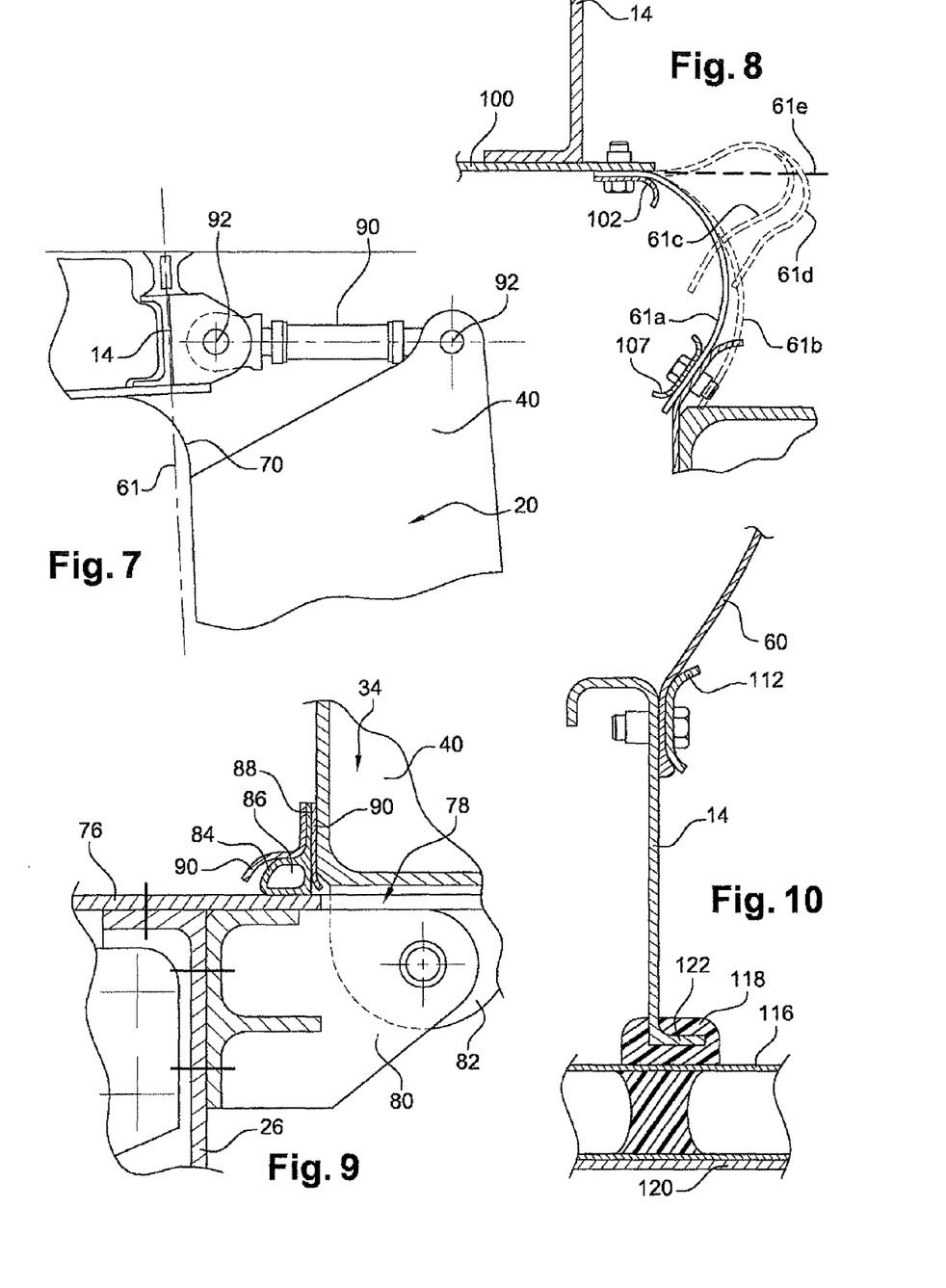
FIG. 7 is a larger-scale view of detail D of FIG. 1 showing how the top portion of the partition is fastened.
FIG. 8 is a view analogous to FIG. 7 showing how the top portion of the sealing diaphragm is fastened and showing how it is deformed.
FIG. 9 is a larger-scale view of detail E of FIG. 1 showing how the bottom portion of the diaphragm is fastened.
FIG. 10 is a section view on plane X-X of the FIG. 5 partition showing how its side portion is fastened.

FIG. 9 shows how one of the rigid portions 34 is fastened to the primary structure of the airplane. The bottom panel 26 extends under the floor 76 of the airplane, in contact with the bottom face of the floor. The floor is cut out to provide an opening 78 in register with each beam 40. For each beam, a fitting 80 is rigidly fastened to the back of the panel 26. A bottom end of the beam 40 has an extension 82 connected to the fitting 80 by conventional connection means using a pin and ball joints. On one of the beams of the rigid portion 34, this connection is suitable for taking up forces in the three X, Y, and Z directions and for transmitting movements along the same directions. On the other of the beams the connection to the fitting is suitable for transmitting forces solely along the X and Z directions.

At the level of the floor 76, sealing with each beam 40 is provided in this example by means of a gasket having a shape like a note in music notation. The gasket 84 thus has a bottom portion 86 of circular profile that is extended upwards from its rear face by a flank 88. The front and rear portions of this gasket are protected by two straps 90. The rear strap is sandwiched between the gasket and the front face of the beam 40, while the front strap 90 is S-shaped, matching the shape of the front face of the gasket. The gasket 84 is thus protected from bruising objects that might be found on the floor. In order to protect it during assembly and disassembly operations, it is advantageous for the gasket to be preassembled with its two straps before being put into place.

With reference to FIG. 7, the connection in the top portion between each beam 40 and the primary structure of the airplane in this example is provided by means of a connecting bar 90. Each of the connecting bars 90 extends essentially in the Z direction. The connecting bar 90 is connected to the frame 14 in front and to the beam behind, the two connections being hinges about hinge axes 92 that are parallel to the Y direction in the present example. Since the connecting bars extend in the Z direction, they can transmit forces and movements in this direction only. Thus, provision is made for at least the top portion of the beam 40 to be capable of moving substantially relative to the primary structure of the airplane. In each rigid portion 34, for any one of the beams, the connecting bar 90 is of fixed length whereas the connecting bar 90 associated with the other beam is of adjustable length. Although this constitutes a statically undetermined assembly of the first degree, the geometrical inaccuracies of the assembly and the ability for one of the connecting bars to be adjusted makes it possible to accommodate that.

Sealing between the partition 20 and the parts fastened to the fuselage, at the top and on the sides is provided by a diaphragm 61 that is independent from the diaphragm 60 but that is preferably made out of the same material. The diaphragm 61 may itself be subjected to large amounts of movement, e.g. by plus or minus 20 mm in the general plane of the partition in the Y and Z directions, and plus or minus 10 mm in the X direction. Thus, in FIG. 8, reference 61a shows the nominal configuration of the diaphragm, reference 61b shows its position reversed along the X direction, reference 61c shows its raised position along the Z direction, and finally reference 61d shows a configuration which is both raised and reversed. As can be seen in FIG. 8, the edge of the top end of the diaphragm 61 is rigidly fastened to a locally horizontal panel 100 that is itself fastened beside its top face to the frames 14. This fastening is performed in this example by sandwiching the diaphragm 61 between the panel and a strap 102. If the partition 20 is removed, the diaphragm 61 may be left in place and may be deployed rearwards in a cylindrical configuration about the axis 6 in order to perform a lining function. It will then have the configuration 61e shown in FIG. 8.

Figure 14:
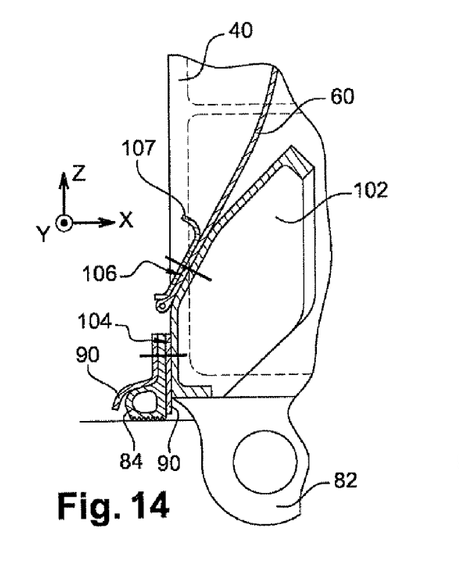
FIG. 14 is a section view showing how the bottom portion of the wall is sealed.

FIG. 14 shows how the diaphragm 60 is fastened at the bottom in sealed manner to a rigid portion 34. The bottom ends of the beams 40 carry a cross-member 102 that presents a vertical plane bottom face 104 and a middle plane face 106 that is parallel to the Y direction and that slopes relative to the X direction, facing upwards a little. The diaphragm 60 is sandwiched between this face and a strap 107 fastened rigidly to the cross-member by suitable means that are not shown. The bottom end edge of the diaphragm extends at a distance from the top edge of the note-shaped gasket 84. Sealed fastening of the diaphragm at its top portion is performed in analogous manner.

Figure 15:
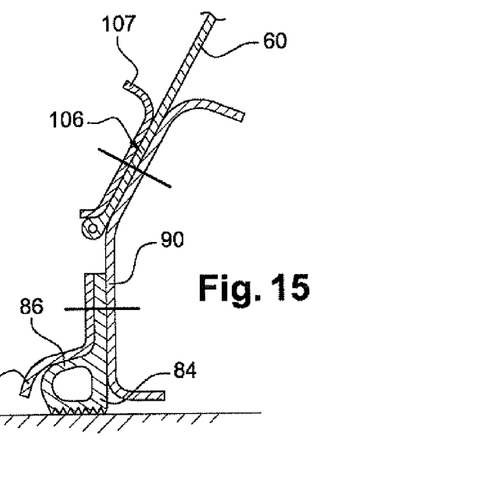
FIG. 15 shows how the partition is sealed at other locations.
Figure 16:
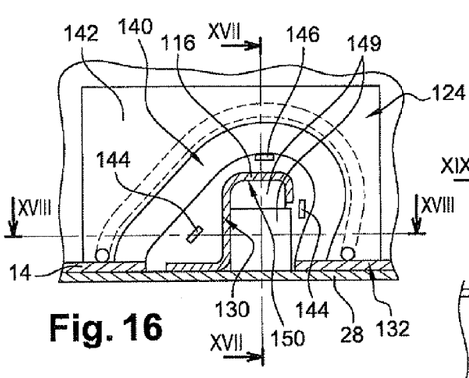
FIGS. 16, 17, and 18 are section views showing the use of a mold for making a sealing block for the partition of the preceding figures, respectively on planes XVI-XVI, XVII-XVII, and XVIII-XVIII of FIGS. 17 and 16.
Figure 17:
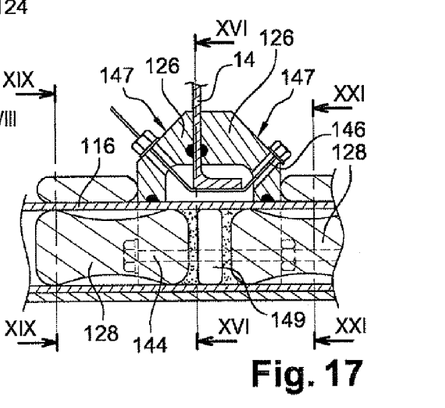
Figure 18:
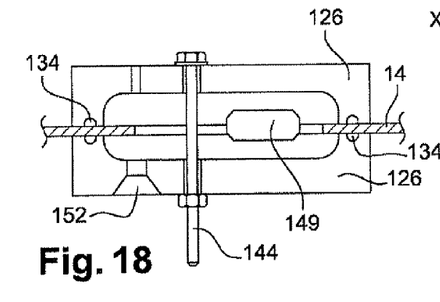
Figure 19:
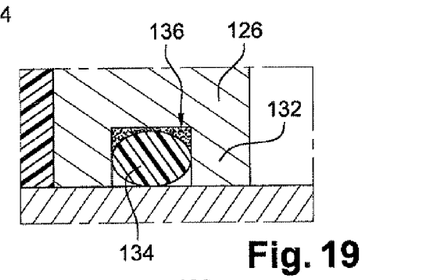
FIGS. 19 and 20 are section views showing how mold portions are sealed, the section of FIG. 19 being on plane XIX-XIX of FIG. 17.

For the connections via a flexible portion, as shown in FIG. 15, it is the rear strap 90 of the note-shaped gasket that presents the face 106 and carries the diaphragm 60. At this location, the gasket merely comes to bear against a face connected to the fuselage.

The partition is installed by means of the following method.

All systems and cabin-lining trim are removed over a distance of about 500 mm on either side of the partition that is to be installed. The systems and trim are put back into place after the structures have been installed.

The rigid subassembly 22 that is to remain permanently is installed during conversion work in which the airplane is unballasted as is the practice for a major repair. While conserving the integrity of the longitudinal stiffeners, sealing is established between the fuselage and the subassembly in the manner described below. For this purpose, each of the stringer passages is sealed, as are the passages for various systems.

The removable portions 34 are installed.

Thereafter, the removable flexible portions 32 are installed.

Provision may be made to fasten the diaphragm segments 60 of the rigid portions 34 to said rigid portions before they are fitted to the fuselage.

Finally, sealing is completed by laying the various gaskets of the diaphragm 61 type or of the musical note type in the zones where movements are controlled.

With reference to FIG. 10, the side portion of the diaphragm 60 is connected in sealed manner to the frame 14 by being sandwiched between a rear face of the frame and a strap 112 that is held rigidly in position against the frame by means of an assembly using bolts and captive nuts.

The frame is fastened to the skin 28 by means of its base 122, except in the location where the frame extends across a stringer 116 such that the base 122 goes round the stringer. The frame and the stringer are mutually perpendicular to each other at this location. The junction on this side of the frame between the frame 14 and the stringer 116 is sealed by means of a block 118 of sealing material that is molded in situ so as to connect the frame in sealed manner to the stringer and to the skin beyond the stringer. Specifically, the block 118 is made of an elastomer such as silicone. With reference to FIGS. 16 to 21, molding is performed by means of a mold 124 comprising a plurality of portions 126 and 128.

The two portions 126 are solid, rigid, and in the form of plates. They are generally symmetrical to each other and are placed on either side of the plane of the web of the frame 14. Each of them presents a notch 130 enabling it to be placed astride the stringer 116 and to be in contact via its base 132 with the frame 14 and with the skin 28. Each of these portions 126 makes sealed contact all along its surface making contact with the frame, the skin, and the outside surface of the stringer. By way of example, and with reference to FIG. 19, this sealing is achieved by means of a flexible O-ring 134 housed in a groove 136 in the base. In a variant embodiment shown in FIG. 20, the base 132 has a series of baffles 138 following one another across the width of the base, with none of these baffles receiving a gasket.

The portions 124 are made of a material that is selected to ensure that it does not adhere to the injected elastomer. By way of example they may be of made of polytetrafluoroethylene (PTFE) or of polyamide 1,1 that is known as rilsan, for example.

Each of the portions 124 presents a cavity 140 into which the elastomer is injected and that serves in particular to receive the base 122 of the frame. Above this cavity, the portions 124 present respective faces 142 whereby they make surface-to-surface contact with the corresponding face of the frame 14. The two portions 124 are clamped against each other by clamping means such as self-blocking fasteners 144 and 146 that extend parallel to the stringer 116. One of these clamping means 146 may be designed to have a V-shaped configuration and pass between the frame 14 and the stringer 116, under the frame while being in direct contact therewith. These clamping means come to bear against the chamfered outer faces 147 of the portions 124.

Figure 21:
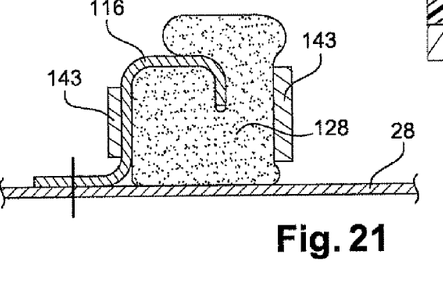
FIG. 21 is a section view on plane XXI-XXI of the arrangement of FIG. 17.

If the stringer 116 is of relatively simple shape, it may suffice to perform the molding by means of the two portions 126. Nevertheless, as shown in this example, the stringer may be of an S-shape, being open on one side. It is then preferable to use two other portions 128 for the mold. Specifically, these portions are stoppers in the form of bones having a narrow portion in the middle. These stoppers are inserted in a housing formed by the stringer, inside that housing, and they are held by means of a clamp 143 clamping them perpendicularly to the web of the stringer. Each of the stoppers may project above the stringer, as shown in FIG. 21. The material from which the stoppers are made is selected so that it does not adhere with the injected elastomer. By way of example, it is possible to use a polymer having closed cells.

In this example, use is also made of rigid cores or blocks 149 made of elastomer that are polymerized prior to injecting the remainder of the material and that are installed directly in the housing of the stringer 116 between its face 150 facing towards the skin and the skin itself. Specifically, two blocks 149 are used that are placed one above the other, one bearing against the skin and the other bearing against this face of the stringer. They are installed in register with the web of the frame 14 prior to closing the mold. These blocks improve the overall rigidity of the molded gasket after it has solidified.

Injection is formed from only one of the portions 126, by means of an injection hole 152 provided for this purpose, using an endpiece that is connected to a tank of liquid elastomer. The two portions 126 are provided with vent holes enabling the cavity to be filled completely.

The sealing block is made as follows.

The zone that is to receive the elastomer is cleaned.

The two portions 126 of the mold are put into place in front of and behind the frame, together with their clamping means.

The two blocks 149 are installed.

The two stoppers 128 are put into place, compressing them initially by hand, as is made possible by the section of the stringer. Thereafter they are clamped by means of the clamp.

Figure 20:
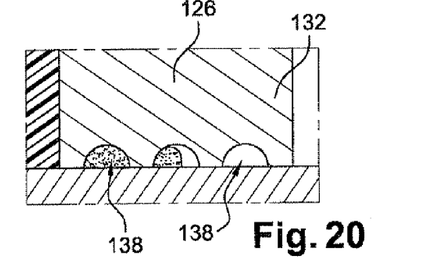

The liquid elastomer is then injected. In the example of FIG. 20, during injection, one or more baffles becomes partially or completely filled with the elastomer. In particular, the liquid comes into contact with the blocks 149 that are embedded therein.

After the elastomer has polymerized, the two stoppers 128 are removed and then the plates 126 are removed by cutting through the self-blocking fasteners 144 and 146. Once the portions 126 have been removed, the self-blocking fasteners are cut once more flush with the faces (in particular the face 147) of the solidified elastomer block 118 from which they emerge. A segment of each fastener thus remains permanently inside the block.

The sealed joint made in this way does not hide any structural fastening, so the connection between the frame and the skin remains accessible, as does the connection between the stringer and the skin, etc.

These operations are performed on a given frame for each of the stringers. The outside dimensions of the molded elastomer block 118 that is installed at each stringer passage are identical for all of the stringers, with this applying even though the stringers may themselves be of different shapes and/or dimensions depending on the stringer segment under consideration. The same applies for the through holes (sometimes called mouse holes) constituting the space between the frame and the stringer in question, which space may present cutouts that differ depending on the dimensions of the stringer and the direction in which the frame is put into place. The various segments of the frame may also be of different dimensions. The above-described mold can be used on each occasion in spite of these differences in terms of dimensions and configurations, since the mold is designed to have dimensions that are large enough to enable it to be compatible with all such situations.

Figure 23:
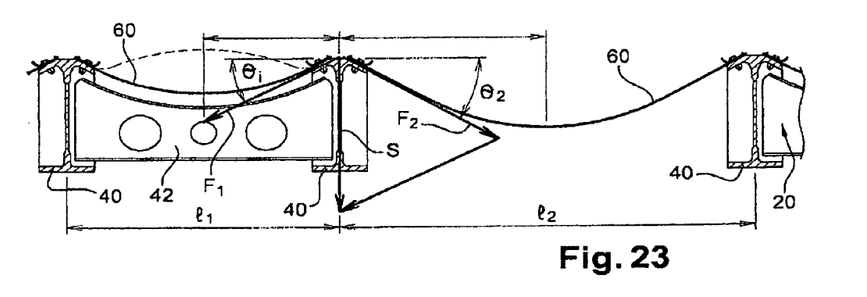
FIG. 23 is a view analogous to FIG. 22 in which the partition is such that the forces are balanced.

FIG. 23 is a force diagram showing the forces exerted on an intermediate beam 40 by the diaphragm segments 60 that it carries. It is explained below how the partition is made so that these forces are balanced when the two nearest beams 40 are not at equal distances from the intermediate beam.

Figure 22:
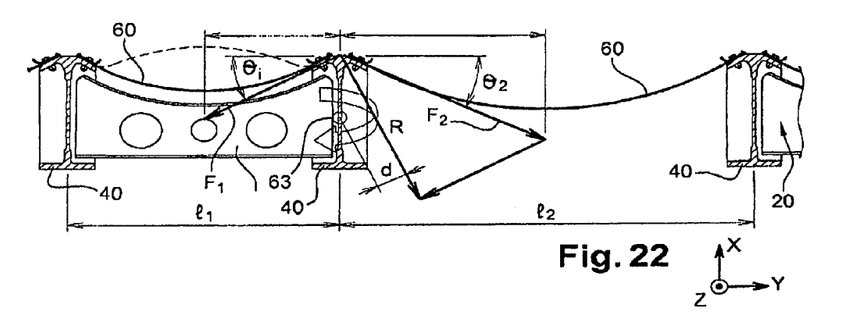
FIG. 22 is a view analogous to FIG. 11 showing the forces exerted by the diaphragm 60 on one of the beams of the partition when the partition is such that these forces are not balanced.

In contrast, FIG. 22 shows the situation in which These forces are not balanced.

Reference $l_1$ designates the distance as measured along the Y direction between the web of the intermediate beam 40 and the web of the beam situated on the left and co-operating therewith to support the left segment 60. Similarly, reference $l_2$ designates the distance between the webs of the beams 40 supporting the diaphragm segment situated on the right. It is assumed herein that the distances $l_1$ and $l_2$ are different from each other, with the distance $l_2$ in this example being equal to about 1.5 times the distance $l_1$.

The beam 40 in a main horizontal section thereof is subjected to a force $F_1$ that is exerted by the diaphragm segment situated on its left and to a force $F_2$ that is exerted by the diaphragm segment situated on its right. It is assumed here that these forces extend in a horizontal plane.

The angle $\theta_1$ designates the angle of the force $F_1$ acting in a direction that is tangential to the diaphragm at its edge, relative to the Y direction, and the angle $\theta_2$ designates the corresponding angle relating to the force $F_2$. Under such circumstances, the two angles $\theta_1$ and $\theta_2$ are equal. This is because the front faces 50 of the flanges 48 also form respective equal angles $\theta_1$ and $\theta_2$ relative to the Y direction, the flanges being symmetrical relative to each other about the plane of the web of the beam 40.

Given the difference between these distances, the force $F_2$ is greater than the force $F_1$. Since these two forces act in directions that are symmetrical about the plane of the web, they have a resultant R that is directed towards the rear and that does not lie in the plane of the web, but that is directed towards the right. The beam 40 is therefore not loaded in balanced or symmetrical manner by the two segments 60. The point of application of this resultant is the front end of the horizontal section of the beam. It gives rise to a twisting moment about the center of inertia 63 of the section, which center lies in the web of the beam halfway between its front and rear edges. There is thus a non-zero distance d between this center of inertia and the resultant R, such that the resultant generates a twisting moment about the center of inertia. In such a situation, it is necessary for the beam to have sufficient material to enable it to withstand such a twisting moment, given that it must also be capable in conventional manner of withstanding a bending movement and a normal force.

In the situation of FIG. 23, the distances $l_1$ and $l_2$ are the same as in FIG. 22, but the angles $\ominus_1$ and $\ominus_2$ are different. The angles are selected in such a manner that the resultant S of the forces $F_1$ and $F_2$ lies in the plane of the web of the beam 40 and is thus parallel to the X direction. This result is obtained by selecting the angle of inclination for the front faces 50 of the flanges 48, which flanges are no longer symmetrical, in such a manner that they form respective angles $\ominus_1$ and $\ominus_2$ with the Y direction such that:

$\ominus_2 = \arctan(\tan \ominus_i \times l_1/l_2)$, where $i=1$.

The faces 50 against which the diaphragm segments make surface-to-surface contact have the same angles of inclination $\theta_1$ and $\theta_2$ respectively relative to the Y direction. The shape and/or the dimensions of each segment is/are adapted so as to obtain this result. By way of example, it may be necessary to increase the radius of curvature of the right segment compared with the situation shown in FIG. 22. This might result in an increase in the weight and the volume of the segment, but that increase is not significant, and on the contrary is negligible compared with the total weight saving achieved for the partition as a whole by means of this arrangement. This ensures that there is no unwanted twisting resultant.

Thus, the shape of each diaphragm segment takes account of the real shape of how that segment is anchored on the beams, which itself takes account of the spacing between the beams. This serves to minimize the forces that the diaphragm segment 60 imparts on the primary structures.

On beams for which the distances and $l_1$ and $l_2$ are equal, the angles $\theta_1$ and $\theta_2$ are equal.

Over the major fraction of its length, each diaphragm segment is formed by a single layer of silicone-impregnated poly-para-phenylene terephthalamide. The diaphragm may weigh 0.5 kilograms per square meter ($kg/m^2$). Selecting this material serves to minimize the weight of each diaphragm segment and makes it equivalent in terms of strength to a diaphragm made of aluminum alloy and having a thickness of 0.2 mm. Such an aluminum alloy diaphragm is not available and is unsuitable for installation because of its fragility, which means that it needs to have a minimum thickness of 1 mm for fabrication reasons and to ensure it is robust against human factors. A weight saving of about 500% is thus achieved compared with an equivalent diaphragm made of aluminum alloy. The diaphragm is nevertheless robust in spite of its low weight. The diaphragm reversing in the event of a reversal of the pressure differential does not give rise to problems. The diaphragm segments 60 withstand not only mere pressure and suction stresses, but can also coexist with the possible damage and wear of human origin.

Figure 24:
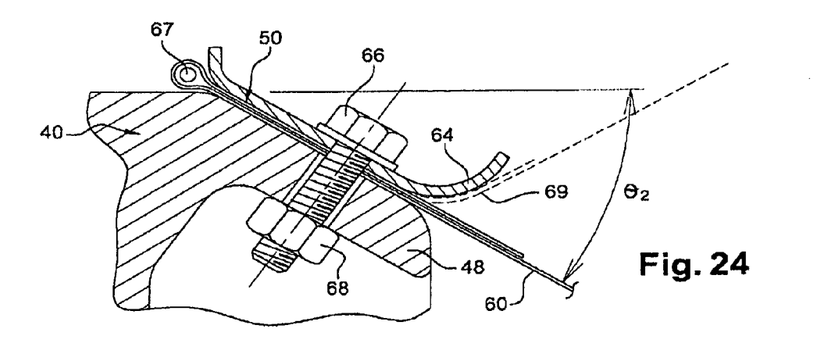
FIG. 24 is another larger-scale view of detail G of FIG. 11.

As shown in FIG. 24, it is advantageous for the material of the diaphragm to be of double thickness where the diaphragm is sandwiched between the strap 64 and the flange 48, it being understood that this is a zone where the diaphragm is stressed particularly greatly. This doubling of thickness can be achieved merely by folding the material forming the diaphragm, and by placing a reinforcing element such as a rod 67 in the fold so as to prevent the fold being flattened. The rod 67 may for example have a diameter lying in the range 2 mm to 3 mm. Specifically it is made of a polyamide material. The rod extends at a distance from the zone of surface-to-surface contact between the strap 64 and the flange 48 and it is not sandwiched between them.

The rod 67 may be placed in the mold that is used for impregnating the resin with the elastomer material. For this purpose, the impregnated material forming a single layer receives the rod and is folded around it before the elastomer is polymerized.

Facing the diaphragm segment 60, and on the same side as the center of curvature of the diaphragm, the strap 64 presents a face 69 of cylindrical shape facing the diaphragm and having its own center of curvature situated on the side of the opposite face 69 of the diaphragm. In the event of the diaphragm being reversed, this face receives the diaphragm, which can bear thereagainst without running the risk of tearing.

The above-described partition 20 presents numerous advantages. It can be put into place and removed. Sealing is provided by means that accommodate both the structural deformations that arise by virtue of the airplane being used and also any geometrical inaccuracies in the various portions that need to be sealed, in particular if the airplane has already been fabricated. The combination of fixed and rigid portions also makes this possible. The number of fastenings that need to be fastened and/or undone when installing the partition in the fuselage or when removing it is small.

By way of example, the time required for removing the partition may be less than 24 hours. The weight of the partition as a whole may for example be about 800 kilograms (kg).

By means of the invention, two operators suffice to install a sealed partition of the kind described very quickly, or else to remove it so it can be taken away. These advantages may result in particular from the fact that the number of partition supports is small and that they are connected to the remainder of the airplane by a number of fastening points that is likewise relatively small.

The partition preferably extends over the major fraction of the transverse area of the inside volume of the fuselage.

As can be seen in FIG. 1, the partition 20, once in place, separates a zone 109 situated in front of the partition from a zone 111 situated behind it. The zone 109 may be subjected to cabin pressure, unlike the zone 111. Or else the zone 111 may contain a liquid such as fuel, unlike the zone 109.

Provisions may be made for the top panel 24 to be stabilized by means of a plurality of fittings connecting it to the skin 28, these fittings extending for example along four consecutive frames. Provision may be made for the bottom panel 26 to be stabilized in the same manner. The rigid subassembly 22 may also have two special gasket-carrying section members installed on the left and the right of the frame.

Naturally, numerous modifications may be made to the invention without going beyond the ambit thereof.

The invention claimed is:

1. An aircraft, including a structural portion such selected from the group comprising a fuselage, a wing, and a tail, the structural portion comprising:
   a wall separating an inside of the structural portion from an outside of the structural portion and comprising components defining between them an inside volume of the structural portion; and
   at least one structural partition separating zones of the inside volume from each other, the at least one structural partition comprising at least one flexible and deformable diaphragm and at least two rigid supports supporting the at least one diaphragm in a discontinuous manner, wherein
   the at least one structural partition is fastened to the structural portion by devices that are separable,
   the rigid supports include a first beam and a second beam such that the at least one diaphragm is connected to the first beam and the second beam, and
   the at least one diaphragm is configured to be inverted between the first beam and the second beam.

2. The aircraft according to claim 1, wherein each of the rigid supports is only connected to another rigid support by its ends.

3. The aircraft according to claim 1, wherein the at least one structural partition separates the two zones in a sealed manner.

4. The aircraft according to claim 1, wherein the at least one diaphragm comprises a reinforced elastomer.

5. The aircraft according to claim 1, wherein the structural portion further includes at least one transverse panel connecting the rigid supports to the remainder of the structural portion.

6. The aircraft according to claim 1, wherein the rigid supports are vertical.

7. The aircraft according to claim 1, wherein the at least one diaphragm is formed of a plurality of disjointed portions.

8. The aircraft according to claim 1, wherein:
   the at least one flexible diaphragm includes at least a first diaphragm segment and a second diaphragm segment; and
   the at least two rigid supports further include a third beam, such that,
      the first beam, the second beam, and the third beam are disposed in a transverse plane, and
      the first beam, the second beam, and the third beam each supports at least one of the diaphragm segments such that the diaphragm segments are arranged in such a manner that:

$$\Theta_2 = \arc \tan(\tan \Theta_i \times l_1/l_2)$$

where:
      $\Theta_i$, designates a non-zero angle between the transverse plane and a tangent to the first diaphragm segment at a junction between the second beam and the first diaphragm segment; and
      $l_1$ designates a distance between the first beam and the second beam, and $l_2$ designates a distance between the second beam and the third beam, wherein $l_1$ is different from $l_2$.

9. The aircraft according to claim 1, wherein the structural portion is a fuselage.

10. A method for efficiently installing structural partitions in an aircraft comprising a wall of a structural portion as selected from the group comprising a fuselage, a wing and a tail, the method comprising:
   separating an outside of the structural portion and an inside of the structural portion such that components of the wall define between them an inside volume of the structural portion: and
   installing at least one structural partition and separating zones of the inside volume from each other with the at least one structural partition, wherein
      the at least one structural partition comprises at least one flexible and deformable diaphragm and at least two supports supporting the at least one diaphragm in a discontinuous manner,
      the supports include a first beam and a second beam such that the at least one diaphragm is connected to the first beam and the second beam,
      the at least one diaphragm is configured to be inverted between the first beam and the second beam, and
      the installation is performed by fastening the at least one structural partition to the structural portion by devices that are separable.

11. An aircraft, including a structural portion selected from the group comprising a fuselage, a wing, and a tail, the structural portion comprising:
   a wall separating an inside of the structural portion from an outside of the structural portion and comprising components defining between them an inside volume of the structural portion; and
   at least one structural partition separating zones of the inside volume from each other, the at least one structural partition comprising at least one flexible and deformable diaphragm and at least two rigid supports supporting the at least one diaphragm in a discontinuous manner, wherein
      the at least one structural partition is fastened to the structural portion by devices that are separable,
      the at least one flexible diaphragm includes at least a first diaphragm segment and a second diaphragm segment,
      the at least two rigid supports include at least a first beam, a second beam, and a third beam such that each beam is disposed in a transverse plane, and
      the diaphragm segments are arranged in such a manner that:

$$\Theta_2 = \arc \tan(\tan \Theta_i \times l_1/l_2)$$

where:
      $\Theta_i$, designates a non-zero angle between the transverse plane and a tangent to the first diaphragm segment at a junction between the second beam and the first diaphragm segment; and
      $l_1$ designates a distance between the first beam and the second beam, and $l_2$ designates a distance between the second beam and the third beam, wherein $l_1$ is different from $l_2$.

* * * * *